United States Patent [19]

Balleys

[11] 3,875,362

[45] Apr. 1, 1975

[54] PROCESS AND APPARATUS FOR ELECTRO-EROSION MACHINING BY MEANS OF ELECTRICAL DISCHARGES PROVIDING A HIGH RATE OF MATERIAL REMOVAL

[75] Inventor: Francois Balleys, Vernier, Switzerland

[73] Assignee: Ateliers des Charmilles S.A., Geneve, Switzerland

[22] Filed: Dec. 26, 1973

[21] Appl. No.: 427,489

[30] Foreign Application Priority Data
Dec. 29, 1972  Switzerland.................. 19064/72

[52] U.S. Cl............ 219/69 M, 219/69 C, 219/69 P
[51] Int. Cl............................................. B23p 1/08
[58] Field of Search..... 219/69 R, 69 M, 69 P, 69 C

[56] References Cited
UNITED STATES PATENTS

| | | | |
|---|---|---|---|
| 3,597,570 | 8/1971 | Saito et al. | 219/69 P |
| 3,604,885 | 9/1971 | Inoue | 219/69 P |
| 3,705,287 | 12/1972 | Saito et al. | 219/69 P |
| 3,789,182 | 1/1974 | Veanea | 219/69 P |

Primary Examiner—Bruce A. Reynolds
Attorney, Agent, or Firm—Hauke, Gifford, Patalidis & Dumont

[57] ABSTRACT

A process and apparatus for the electro-erosion machining of a workpiece by means of electrical discharges occurring between an electrode tool and the workpiece, permitting a considerable reduction of the wear of the electrode tool and which consist of appropriate logic circuit means for adjusting the duration of voltage cut-off between consecutive voltage pulses applied across the gap between the electrode tool and the workpiece, and in addition, or in the alternative, for adjusting the number of pulses in each pulse train such that at least one of the discharges in each train is effected at a characteristic voltage drop rate which is situated between the voltage drop rate of a normal pulse and the voltage drop rate of an abnormal pulse such as results from arcing or short circuit conditions between the electrode tool and workpiece, and adjusting the cut-off duration between two consecutive pulse trains to a time interval long enough to insure that at least the first discharge pulse in each pulse train is a normal nominal pulse.

51 Claims, 3 Drawing Figures

PROCESS AND APPARATUS FOR ELECTRO-EROSION MACHINING BY MEANS OF ELECTRICAL DISCHARGES PROVIDING A HIGH RATE OF MATERIAL REMOVAL

BACKGROUND OF THE INVENTION

The present invention relates to a process and apparatus for the electrical discharge machining (EDM) of a workpiece, which permits to considerably reduce the wear of the electrode tool for a given surface finish and a given rate of material removal from the workpiece. A known method for reducing the relative wear rate of the electrode tool, that is the ratio of the rate of material removal from the electrode tool to the rate of material removal from the workpiece during a predetermined machining time period, consists in decreasing the duration of the pulse cut-off time intervals between two consecutive voltage pulses. However, such a process is somewhat limited in view of the fact that the decrease of the pulse cut-off time intervals causes a progressive contamination of the dielectric fluid in the machining zone and the apparition of damaging abnormal discharges.

It is also known to interrupt the generation of electrical discharges after detecting damaging discharges caused by arcing or resulting from an increase of the conductivity of the machining zone, and to modify at least one of the machining parameters as a function of the detected abnormal operation. However, apparatus and method based on this principle have the inconvenience to effecting a correction of the conditions of operation only after the abnormal and damaging discharges have already taken place.

The present invention overcomes the disadvantages and shortcomings of the prior art. In accordance with the present invention, intermittent and erosive electrical discharges in the form of controlled current pulses are applied to the machining zone between an electrode tool and an electrode workpiece. The pulses are obtained from at least one direct current generator connected across the machining gap, and the passage of current across the gap is controllably pulsed by alternatively opening and closing the circuit, such that the DC generator is cut-off from the machining gap during cut-off time intervals between two consecutive voltage pulses, each voltage pulse having a nominal no-load voltage higher than a predetermined level.

The improvement of the invention consists in adjustably modifying the cut-off time interval between two consecutive voltage pulses in a pulse train to a relatively short duration and, in addition or alternatively, in adjustably controlling the number of pulses within each pulse train in such manner that at least one of the electrical discharges within a single pulse train consists of an average load discharge, or "characteristic" discharge, for which the discharge voltage decay amplitude, measured between the leading edge of the current pulse and the trailing edge of the current pulse, remains lower than a voltage level corresponding to a "normal" machining discharge and higher than a voltage level corresponding to arcing or short circuits between the electrode tool and the electrode workpiece, means being provided for adjusting the duration of the cut-off time interval between two consecutive pulse trains to a value sufficiently large to cause at least the first discharge pulse in each train to be other than a characteristic discharge pulse.

It will therefore be appreciated that the present invention permits for the first time in the field of EDM to provide a detection and control system based upon the existence of particularly characteristic electrical discharges which are still electro-erosive and not yet damaging, and which are endowed with the remarkable property of considerably reducing the relative wear of the electrode tool. The characteristic discharges are produced, inter alia, when the voltage pulses have an ionization voltage higher than a threshold of the order of 200 volts to 300 volts and when the cut-off duration between two consecutive pulses is very short, for example of the order of 2 microseconds. When such conditions are present, the machining voltage shortly after the beginning of the current pulse decreases more rapidly than is the case for a normal machining discharge. It is therefore possible to detect the characteristic discharges by determining immediately after the beginning of a current pulse the voltage level, or the slope of the voltage decrease curve, and comparing the voltage level or slope to a predetermined threshold corresponding to those of a normal voltage discharge at the same precise moment in time.

It has been observed that the characteristic discharges have the property of occurring at a very high spatial density, which causes a gradual deterioration of the workpiece surface finish if too many of the characteric discharges are occurring in succession.

In order to take advantage of the peculiar property of the characteristic discharges as far as causing a decrease in the relative wear rate of the electrode tool is concerned while preserving a good quality of the workpiece surface finish, the control system of the present invention causes an interruption in the occurrence of the characteristic discharges during a time interval sufficiently long to cause the first electrical discharge following the time interval to be a discharge other than a characteristic discharge. There results a displacement of the concentration area of the characteric discharges in the machining zone and an improvement of the workpiece surface finish. In this manner, the workpiece surface finish is greatly improved as a result of selecting the number of the characteristic discharges applied to the machining zone in the course of each pulse train.

SUMMARY OF THE INVENTION

The novel process and apparatus of the invention thus permit to electro-erode a workpiece with a relative wear of the electrode tool which is at least three times less than the relative wear achieved by means of conventional EDM processes and apparatus. By way of the present invention it is thus possible to machine a workpiece with a reduced wear of the electrode tool while maintaining an optimum material removal rate from the workpiece, that is it is possible to machine with an optimum efficiency. The invention thus permits to operate with pulses having a high voltage amplitude and to achieve a high ratio of total duration of current pulses to the total duration of the cut-off time intervals between two consecutive voltage pulses in a single pulse train without causing the apparition of damaging self sustained arcs.

BRIEF DESCRIPTION OF THE DRAWINGS

The present invention will be best understood when the following description of the best mode contemplated for practicing the invention is read in conjunction with the annexed drawing wherein like reference numerals and characters refer to like parts throughout the several figures and which represent, schematically and for illustrative purpose only, diagrams of appropriate circuits for practicing the present invention and in which.

DETAILED DESCRIPTION OF THE PREFERRED EMBODIMENTS

Figure 1:
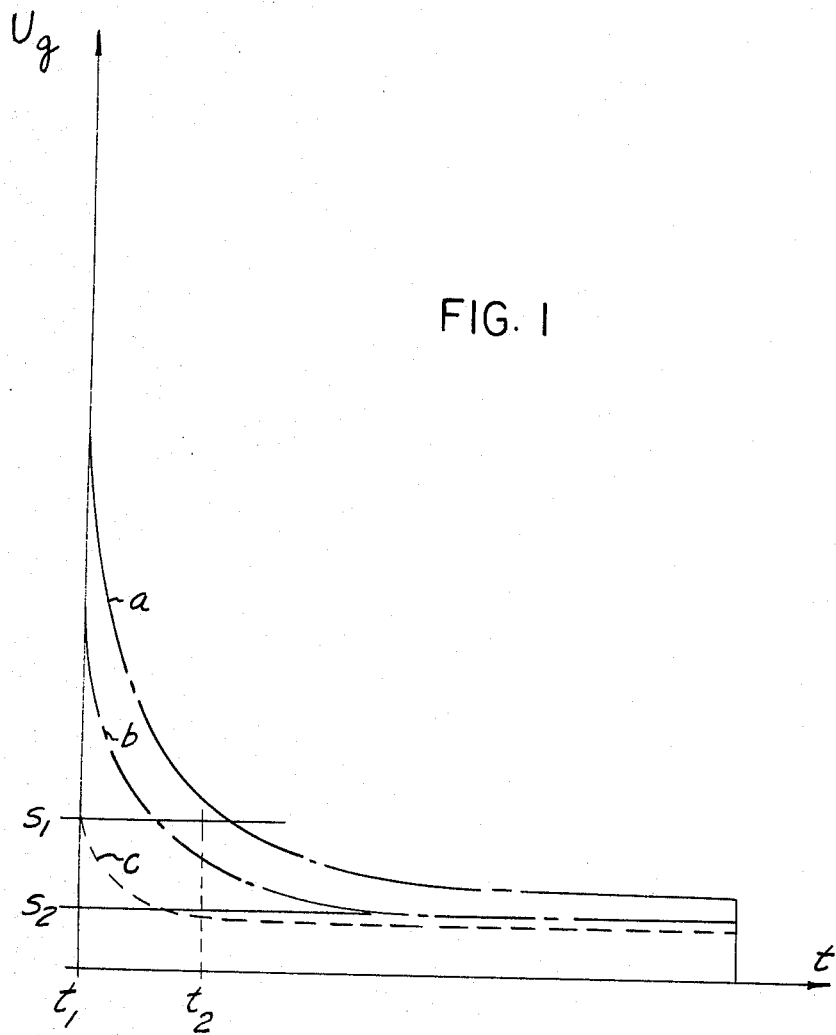
FIG. 1 is a diagram of typical discharge voltage decay curves.

FIG. 1 illustrates typical discharge voltage decay curves as a function of time. Curve $a$ represents the voltage decay for a "normal" discharge, curve $b$ represents a typical voltage decay curve for a "characteristic" discharge, and curve $c$ typically represents the voltage decay of a pulse in the event of arcing or short-circuit between the electrode tool and the workpiece. A pair of threshold values, respectively designated by horizontal lines $S_1$ and $S_2$, has been indicated on the diagram. The line $S_1$ represents a voltage threshold substantially higher than the machining voltage at the end of a single discharge pulse, while the other horizontal line, $S_2$, represents a voltage threshold which is slightly lower than the machining voltage at the end of a discharge pulse.

It is immediately apparent from the diagram of FIG. 1 that a characteristic discharge may be detected by measuring its absolute machining voltage $U_g$ shortly after the beginning of the occurrence of the discharge between the electrode tool and the workpiece. Each discharge starts at time $t_1$ and the voltage of a normal discharge, represented by curve $a$, is higher than the threshold $S_1$. At time $t_2$ the voltage of the characteristic discharge, represented by curve $b$, is comprised between the thresholds $S_1$ and $S_2$. In the event of the occurrence of a short circuit or of an arc, the discharge voltage, as shown by curve $c$ at time $t_2$, is equal to or lower than the threshold $S_2$ at time $t_2$.

Figure 2:
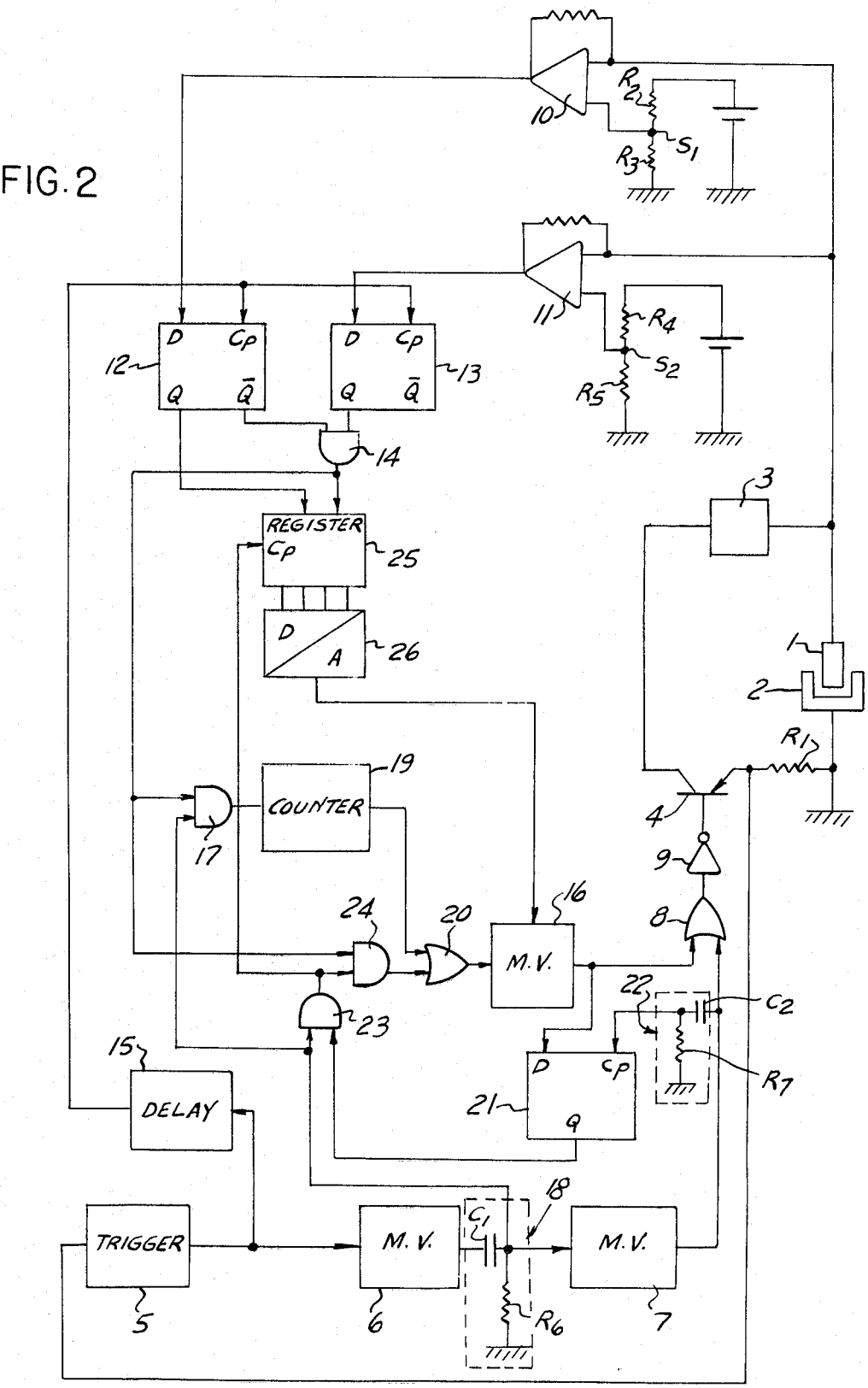
FIG. 2 is a schematic diagram of a typical circuit for practicing the invention.

FIG. 2 illustrates the electrical circuit of an EDM machine in which means, not shown, cause an electrode tool 1 to be displaced towards the workpiece 2, such as to maintain between the face of the electrode tool 1 and the surface of the workpiece 2 immersed in an appropriate dielectric fluid a predetermined gap, of the order of a fraction of a millimeter, commensurate with the desired machining rate. The machining current is supplied by a source 3 of direct current, and the current flow is controllably interrupted periodically by means of a power transistor 4 such that consecutive direct current pulses are applied across the machining gap between the electrode tool 1 and the workpiece 2.

The machining current flows through a resistor $R_1$ connected in series in the electrode tool-workpiece circuit, and the voltage appearing across the resistor $R_1$ permits to detect the precise moment at which current begins to flow through the circuit. It is known that the current flow through the machining gap randomly lags behind the exact moment at which a machining voltage pulse is applied across the gap between the electrode tool and the workpiece, the delay between the current pulse and the voltage pulse varying from one discharge to the next.

The voltage signal appearing across the resistor $R_1$ is applied to the input of a Schmitt trigger 5 which controls a first monostable multivibrator 6 connected to a second monostable multivibrator 7. The duration of the instability state of the multivibrator 6 defines the duration of current flow for each machining current pulse, while the duration of the instability state of the multivibrator 7 defines the cut-off time interval between the end of a machining discharge and the moment at which the next voltage pulse is applied to the machining gap. The output of the multivibrator 7 is connected to an input of an OR gate 8, and the output of the OR gate is connected to the base of the power transistor 4 through an inverter 9.

The second input of the OR gate 8 is connected to the output of a multivibrator 16 which is controlled in the manner hereinafter explained in detail. The multivibrator 16, while in its unstable state, provides a signal at its output which, when applied to the base of the power transistor 4 through the OR gate 8 and the inverter 9, holds the emitter-collector circuit of the transistor in a non-conductive state. The duration of the instability state of the multivibrator 16 is longer than that of the multivibrator 7 and provides a control for complete pulse cut-off intervals such that machining of the workpiece is effected by consecutive pulse trains, separated from each other by such cut-off intervals as controlled by the multivibrator 16.

The voltage appearing between the electrode tool and the workpiece is applied to one of the inputs of two differential amplifiers 10 and 11, each of which compares the voltage across the gap with a reference voltage corresponding to the threshold $S_1$ or $S_2$ mentioned with reference to the diagram of FIG. 1. The voltage threshold $S_1$, obtained from a voltage divider consisting of resistors $R_2$ and $R_3$ connected across a reference voltage source, is applied to the second input of the differential amplifier 10. The voltage threshold $S_2$, applied to the second input of the differential amplifier 11, is obtained from a voltage divider consisting of the resistors $R_4$ and $R_5$ connected across a voltage reference source. The differential amplifier 10 supplies a signal, such as a voltage level, at its output when the voltage across the gap is higher than the threshold $S_1$, and the differential amplifier 11 supplies a signal at its output when the voltage across the gap is higher than the threshold $S_2$. The apparition of a voltage at the outputs of both differential amplifiers 10 and 11 at the time $t_2$ indicates the occurrence of a normal discharge (curve $a$ of FIG. 1). If there is no voltage appearing at the outputs of the differential amplifiers 10 and 11 at the time $t_2$, such a condition is representative of the occurrence of an arc or short circuit between the electrode tool and the workpiece (curve $c$ of FIG. 1). However, if there is no voltage appearing at the output of the differential amplifier 10 while voltage appears at the output of the differential amplifier 11 at the time $t_2$, such a condition is indicative of the occurrence of a characteristic discharge (curve $b$ at FIG. 1).

The output levels of the differential amplifiers 10 and 11 at the time $t_2$ are sampled by means of a pair of retentive memories, or flip-flops, 12 and 13 having their respective outputs $\overline{Q}$ and Q connected to the inputs of an AND gate 14. Clock pulses supplied to the $C_p$ input of each retentive memory are obtained from the output of the trigger 5 through a line delay 15 providing a time delay corresponding to the interval between real time $t_1$ and real time $t_2$ of FIG. 1.

When a clock pulse is supplied to the inputs $C_p$ of the retentive memories 12 and 13 simultaneously with a low voltage level being provided at the output of the differential amplifier 10 and a high voltage level appearing at the output of the differential amplifier 11, thus indicating the presence of a characteristic discharge at the gap, the output $\overline{Q}$ of the retentive memory 12 and the output Q of the retentive memory 13 both provide simultaneously signals, such that the AND gate 14 provides an output signal level extending until the next clock pulse is applied to the inputs $C_p$ of the two retentive memories. The signal at the output of the AND gate 14 is applied to an input of an AND gate 17. The second input of the AND gate 17 is connected to the output of an RC element 18 consisting of a capacitor $C_1$ and a grounded resistor $R_6$ connected at the output of the multivibrator 6. Each time the multivibrator 6 returns to its stable state while controlling the end of a current discharge, thus at the trailing edge of a signal appearing at the output of the multivibrator 6, a pulse is provided from the RC element 18 which is applied to the second input of the gate 17. Consequently, at the end of each machining pulse having a voltage decay curve corresponding to the characteristic discharge, a pulse is provided at the output of the AND gate 17 which is applied to a counter 19 set to provide an output pulse every time a predetermined count of pulses has been counted. Thus, each time a pulse is provided at the output of the counter 19, which corresponds to a predetermined number of characteristic pulses appearing across the machining gap, that output pulse is applied through an OR gate 20 to the input of the multivibrator 16, thus causing the multivibrator 16 to be turned to its unstable state, and the signal resultant from that unstable state appearing at the output of the multivibrator is applied through the OR gate 8 and the inverter 9 to the base of the power transistor 4, turning the transistor off and preventing machining pulses from occurring across the gap.

The output of the multivibrator 16 is also connected to an input D of a retentive memory, or flip-flop, 21 having another input $C_p$ receiving clock pulses provided by an RC circuit element 22 consisting of a capacitor $C_2$ and grounded resistor $R_7$, and formed by the trailing edge of the pulses at the output of the multivibrator 7 to which the RC circuit element 22 is connected. The output Q of the retentive memory 21 thus provides a zero level as long as the multivibrator 16 is in a stable state, therefore at the beginning of the second pulse in each pulse train. The signal at the output Q of the retentive memory 21 reaches a positive level as soon as the multivibrator 16 is switched to its unstable state, which corresponds to the first return of the multivibrator 7 to its stable state.

The signal level at the output Q of the retentive memory 21 is applied to an input of an AND gate 23, and the other input of the AND gate 23 receives pulses from the RC circuit element 18, thus pulses corresponding to each negative trailing edge of the signal appearing at the output of the multivibrator 6. The output of the AND gate 23 therefore provides a signal only for each first pulse in a pulse train, and the signal at the output of the AND gate 23 is applied to an input of an AND gate 24. In this manner, the AND gate 24 provides an output only when a characteristic discharge is detected by the differential amplifiers 10 and 11 simultaneously with a signal being provided at the other input of the gate 24 corresponding to the first pulse in each pulse train. Consequently, each time the first pulse of a pulse train corresponds to a characteristic discharge across the gap, which is representative of the deionization between the electrode tool and the workpiece having not been sufficiently accomplished, the multivibrator 16 is automatically immediately controlled to its unstable state for the purpose of providing a new and longer cut-off interval between pulse trains.

In addition to the elements previously described, the circuit of FIG. 2 further comprises an inverting transfer register 25 and a digital to analog converter 26, whose function it is to control the duration of the unstable state of the multivibrator 16. The transfer register 25 is provided with two inputs, one of which is connected to the output Q of the retentive memory 12 and receives a signal which is representative of the occurrence of a normal machining pulse, while the other input, connected to the output of the AND gate 14, receives a signal each time there occurs a characteristic machining pulse.

The transfer register 25 receives at its input $C_p$ clock pulses provided at the output of the AND gate 23, in other words a clock pulse at the end of each first machining pulse in a pulse train. In this manner, the transfer register 25 switches on one of its outputs of a higher or lower degree according to whether or not, at the end of the first pulse in a single pulse train, the pulse has been recognized as being a normal pulse or a characteristic pulse. The digital to analog converter 26 provides at its output a voltage level as a function of the most significant order of the particular output of the shift register 25 which has been turned on and the voltage level at the output of the digital to analog converter 26 biases the multivibrator 16 for shortening the duration of its unstable state as soon as the first pulse in a pulse train is a normal machining pulse.

The circuit of FIG. 2 may be simplified in the event that it is not desired to vary the duration of the multivibrator 16; in that case, the shift register 25 and the digital to analog converter 26 are omitted.

Figure 3:
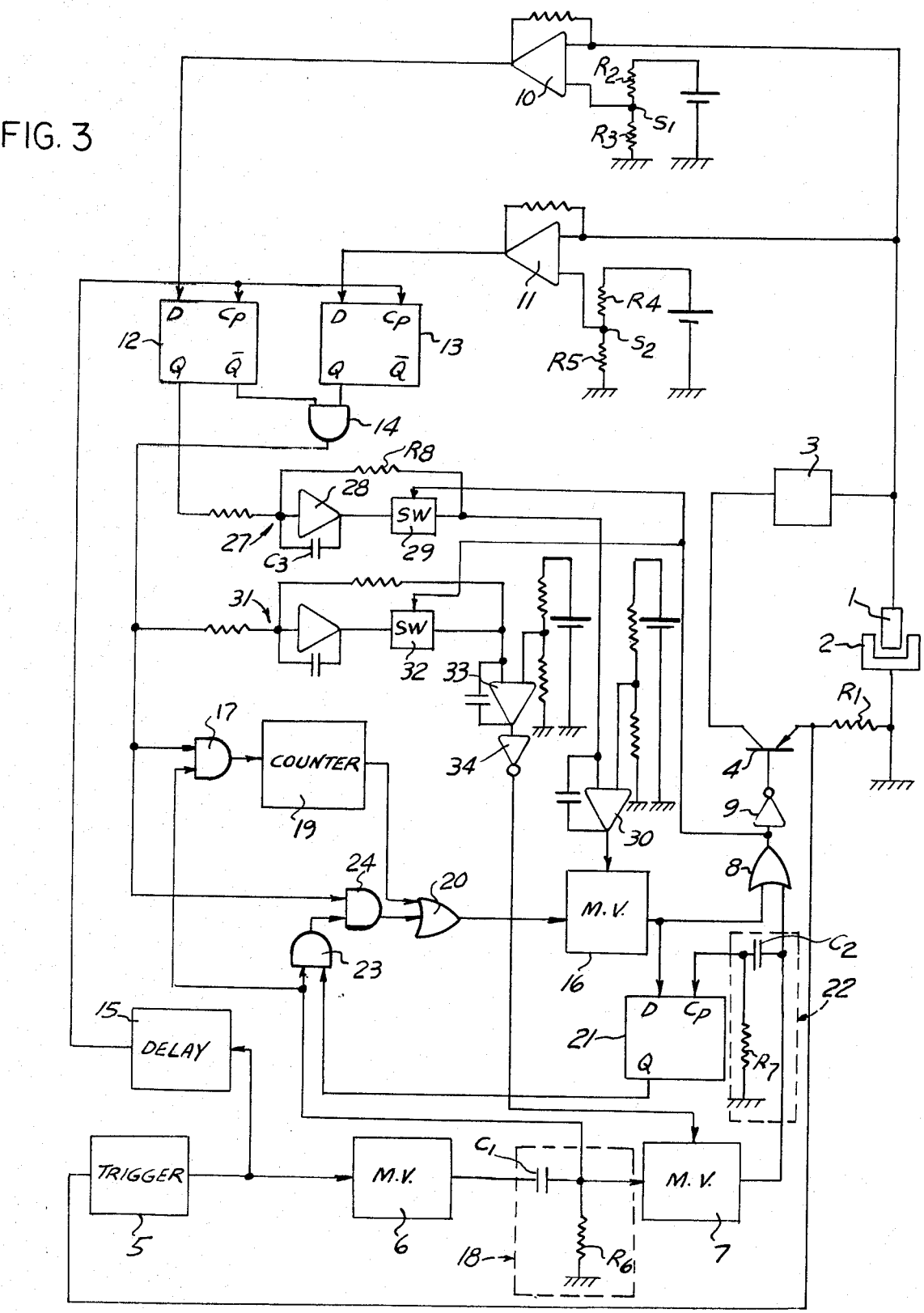
FIG. 3 is a schematic diagram of a modification of the circuit of FIG. 2.

FIG. 3 illustrates a modification of the circuit of FIG. 2. In the modification of FIG. 3, the duration of the instability state of the multivibrators 7 and 16, respectively, is modified automatically as a function of the average value of the number of respectively characteristic and normal discharges.

To accomplish that purpose, the output Q of the retentive memory 12 which, as previously mentioned with respect to FIG. 2, is at a high level after each normal discharge, is connected to an integrator 27 which consists of an amplifier 28 combined with an RC element consisting of a resistor $R_8$ having a terminal connected to the input of the amplifier and a shunt capacitor $C_3$ connected between the input and the output of the amplifier, and a switch 29 connected between the output of the amplifier 28 and the other terminal of the resistor $R_8$. The switch 29 is controlled by the output of the OR gate 8 to avoid that the capacitor $C_3$ discharges into the resistor $R_8$ during the cut-off intervals between two machining pulses. The output of the integrator 27 is connected to an input of a comparator 30 consisting of a differential amplifier having its input connected to a voltage reference. The output of the comparator 30 directly controls the duration of the instability state of the multivibrator 16 such as to cause a shortening of the duration of its instability state when the average of the number of normal discharges is high.

The control of the duration of the unstable state of the multivibrator 7 is obtained in a similar manner by an integrator 31 having an input to which is applied the output from the AND gate 14, which is indicative of normal discharges. The output of the integrator 31, through a switch 32, is connected to an input of a comparator 33 whose output controls the duration of the unstable state of the multivibrator 7 through an inverter 34. The inverter 34 is required for obtaining an increase of the duration of the unstable state of the multivibrator 7, corresponding to the cut-off time intervals between two consecutive machining pulses, as a result of an increase of the number of characteristic discharges.

By means of the arrangement of FIG. 3, a fine increment adjustment of the machining conditions is obtained because the duration of the cut-off time interval between two consecutive machining pulses influences the number of characteristic discharges which are permitted to occur in a pulse train after a series of normal discharges and before the apparition of gap short circuits or arcing. The shorter the cut-off interval, the more rapid is the appearance of short circuits. The cut-off interval between two consecutive pulse trains, which is controlled by the multivibrator 16, causes the deionization of the machining zone, which in turn permits to vary the number of normal discharges at the beginning of a pulse train prior to the occurrence of characteristic discharges.

Having thus described the invention by way of specific examples of applications thereof, what is claimed and sought to be protected by United States Letters Patent is as follows:

1. A process for machining a workpiece by means of intermittent electrical discharges provided by controlled current pulses whereby consecutive trains of consecutive voltage pulses are applied across a machining gap between said workpiece and an electrode tool by switching on and off across said gap at least one source of direct current such that said source is switched off during pulse cut-off time intervals between two consecutive voltage pulses and during pulse train cut-off time intervals between consecutive pulse trains, each pulse having a no-load voltage amplitude of a predetermined value, said method comprising adjustably increasing the number of said pulses within a single pulse train such that at least one of the discharges across the gap is caused to be a characteristic discharge for which the discharge voltage amplitude measured between the beginning of a current pulse and the time at which the current is cut off is lower than a predetermined voltage amplitude corresponding to a normal machining discharge and higher than a voltage amplitude corresponding to arcing or a short circuit across the gap, and increasing the duration of the cut-off interval between two consecutive pulse trains to a sufficiently long interval to prevent at least the first discharge within a single train from being one of said characteristic discharges.

2. The process of claim 1 further comprising decreasing the duration of the pulse cut-off time interval between two consecutive voltage pulses within a single pulse train to a relatively short duration.

3. The process of claim 1 wherein said characteristic discharge is detected by measuring the decay slope of said discharge voltage wave a predetermined period of time after the beginning of the current pulse of said characteristic discharge, said period of time being substantially short relative to the period of said discharge.

4. The process of claim 1 wherein said characteristic discharge is detected by measuring at the end of a predetermined time period the voltage amplitude of the machining pulse.

5. The process of claim 4 wherein said characteristic discharge is detected by determining the discharge for which the voltage pulse decay measured at the end of said time period is lower than a first threshold representative of normal machining discharges and higher than a second threshold lower than said first threshold, said second threshold being representative of arcing or short circuits across said gap.

6. The process of claim 1 further comprising providing a constant and predetermined cut-off time interval between two consecutive voltage pulses within a single train.

7. The process of claim 1 wherein the cut-off time interval between two consecutive voltage pulses within a single train is variable such as to maintain a substantially constant ratio of the number of characteristic discharges to the number of voltage pulses across said gap.

8. The process of claim 1 wherein the number of pulses within a single train is adjusted such as to maintain a substantially constant ratio of the number of characteristic discharges to the number of voltage pulses across said gap.

9. The process of claim 1 wherein the duration of the cut-off time intervals between two voltage pulses within a single train is decreased.

10. The process of claim 1 wherein the duration of the cut-off time intervals between two consecutive pulses within a single train is increased.

11. The process of claim 1 wherein each pulse train comprises a predetermined number of voltage pulses.

12. The process of claim 1 wherein each pulse train comprises a predetermined number of current pulses.

13. The process of claim 1 wherein a pulse train is cut off as soon as a predetermined number of characteristic discharges has occurred in a single train.

14. The process of claim 1 wherein a pulse train is cut off as soon as the ratio of the number of characteristic discharges within said train to the number of voltage pulses across the machining gap reaches a predetermined value.

15. The process of claim 1 wherein the cut-off interval between two consecutive pulse trains has a constant and predetermined duration.

16. The process of claim 1 wherein the cut-off interval between two consecutive pulse trains is variable such as to control the number of normal machining discharges which immediately precede the characteristic discharges within a single pulse train.

17. In an apparatus for electro-eroding a workpiece by means of current pulses resulting from applying across a machining gap formed between an electrode tool and a workpiece consecutive voltage pulses by switching on and off across said gap at least one source of direct current such that the source is disconnected from across the gap during cut-off time intervals between two consecutive voltage pulses, each of said trains comprising a plurality of voltage pulses each having a no-load voltage amplitude higher than a predetermined threshold and said trains of consecutive pulses being separated by a cut-off time interval during which none of said discharges occurrs across the gap and means for adjustably controlling the cut-off time interval between two consecutive pulse trains, the improvement comprising means for measuring the machining voltage amplitude of each pulse shortly after the moment at which current flows through the gap, means for effecting a comparison between said voltage amplitude and at least one predetermined value, means for deriving from said comparison a logic signal of alternative values corresponding to a sampling of respectively the presence and absence of characteristic machining discharges, means for storing said logic signal between two consecutive samplings, and means for adjusting as a function of said logic signal the number of voltage pulses within a single pulse train for controlling the rate of occurrence of said characteristic discharge across said machining gap, wherein each of said characteristic machining discharges is a discharge across said gap for which the discharge voltage amplitude measured between the beginning of a current pulse and the time at which the current is cut off is higher than a voltage amplitude corresponding to arcing or a short circuit across the gap and lower than a predetermined voltage amplitude corresponding to a normal machining discharge.

18. The improvement of claim 17 further comprising means for detecting respectively the presence and absence of a characteristic discharge corresponding to the first discharge within each pulse train, means for providing a logic signal of alternative values corresponding respectively to said presence and absence of said characteristic discharge, and means for respectively allowing and preventing the occurrence of said pulse train after said first discharge according to the significance of said logic signal.

19. The improvement of claim 17 further comprising means for counting the number of machining discharges and means for cutting off a pulse train when the number of said machining discharges within said train reaches a predetermined number.

20. The improvement of claim 17 further comprising means for counting the number of said characteristic discharges and means for cutting off a pulse train when the number of said characteristic discharges within said train reaches a predetermined number.

21. In an apparatus for electro-eroding a workpiece by means of current pulses resulting from applying across a machining gap formed between an electrode tool and a workpiece consecutive voltage pulses by switching on and off across said gap at least one source of direct current such that the source is disconnected from across the gap during cut-off time intervals between two consecutive voltage pulses, means for supplying across said gap trains of consecutive pulses, each of said trains comprising a plurality of voltage pulses each having a no-load voltage amplitude higher than a predetermined threshold and said trains of consecutive pulses being separated by a cut-off time interval during which none of said discharges occurs across the gap and means for adjustably controlling the cut-off time interval between two consecutive pulse trains, the improvement comprising means for measuring the slope of the voltage amplitude decay of said pulses shortly after the moment at which current flows through the gap, means for effecting a comparison between said slope and at least one predetermined value, means for deriving from said comparison a logic signal of alternative values corresponding to a sampling of respectively the presence and absence of characteristic machining discharges, means for storing said logic signal between two consecutive samplings, and means for adjusting as a function of said logic signal the number of voltage pulses within a single pulse train for controlling the rate of occurrence of said characteristic discharges across said machining gap, wherein each of said characteristic machining discharges is a discharge across said gap for which the discharge voltage amplitude measured between the beginning of a current pulse and the time at which the current is cut off is higher than a voltage amplitude corresponding to arcing or a short circuit across the gap and lower than a predetermined voltage amplitude corresponding to a normal machining discharge.

22. The improvement of claim 21 further comprising means for detecting respectively the presence and absence of a characteristic discharge corresponding to the first discharge within each pulse train, means for providing a logic signal of alternative values corresponding respectively to said presence and absence of said characteristic discharge, and means for respectively allowing and preventing the occurrence of said pulse train after said first discharge according to the significance of said logic signal.

23. The improvement of claim 21 further comprising means for counting the number of machining discharges and means for cutting off a pulse train when the number of said machining discharges within said train reaches a predetermined number.

24. The improvement of claim 21 further comprising means for counting the number of said characteristic discharges and means for cutting off a pulse train when the number of said characteristic discharges within said train reaches a predetermined number.

25. In an apparatus for electro-eroding a workpiece by means of current pulses resulting from applying across a machining gap formed between an electrode tool and a workpiece consecutive voltage pulses by switching on and off across said gap at least one source of direct current such that the source is disconnected from across the gap during cut-off time intervals between two consecutive voltage pulses, means for supplying across said gap trains of consecutive pulses, each of said trains comprising a plurality of voltage pulses each having a no-load voltage amplitude higher than a predetermined threshold and said consecutive pulses being separated by a cut-off time interval during which none of said discharges occurs across the gap and means for adjustably controlling the cut-off time interval between two consecutive pulse trains, the improvement comprising means for measuring the machining voltage amplitude of each pulse shortly after the moment at which current flows through the gap, means for effecting a comparison between said voltage amplitude and at least one predetermined value, means for deriving from said comparison a logic signal of alternative values corresponding to a sampling of respectively the presence and absence of characteristic machining discharges, means for storing said logic signal between two consecutive samplings, and means for adjusting as a function of said logic signal the duration of cut-off intervals between two consecutive voltage pulses within a single pulse train for controlling the rate of occurrence of said characteristic discharges across said machining gap, wherein each of said characteristic machining discharges is a discharge across said gap for which the discharge voltage amplitude measured between the beginning of a current pulse and the time at which the current is cut off is higher than a voltage amplitude corresponding to arcing or a short circuit across the gap and lower than a predetermined voltage amplitude corresponding to a normal machining discharge.

26. The improvement of claim 25 further comprising means for detecting respectively the presence and absence of a characteristic discharge corresponding to the first discharge within each pulse train, means for providing a logic signal of alternative values corresponding respectively to said presence and absence of said characteristic discharge, and means for respectively increasing and decreasing according to said logic signal by progressive steps the cut-off time interval between two consecutive pulse trains.

27. The improvement of claim 26 further comprising means for respectively allowing and preventing the occurrence of said pulse train after said first discharge according to the significance of said logic signal.

28. The improvement of claim 25 further comprising means for respectively allowing and preventing the occurrence of said pulse train after said first discharge according to the significance of said logic signal.

29. The improvement of claim 25 further comprising means for providing an analog magnitude representative of the average value of said logic signal and means for varying the duration of said cut-off interval between two consecutive voltage pulses within a single train as a function of the magnitude of the difference between a reference magnitude of predetermined value and said analog magnitude.

30. The improvement of claim 25 further comprising means for detecting the presence or absence of normal machining discharges, means for providing a corresponding logic signal, means for developing an analog magnitude representative of the average value of said logic signal, and means for varying the duration of said cut-off interval between two consecutive pulse trains as a function of the magnitude of the difference between a reference magnitude of a predetermined value and said analog magnitude.

31. The improvement of claim 25 further comprising means for counting the number of said characteristic discharges and means for cutting off a pulse train when the number of said characteristic discharges within a single pulse train reaches a predetermined number.

32. The improvement of claim 25 further comprising means for counting the number of machining discharges and means for cutting off a pulse train when the number of said machining discharges within a single pulse train reaches a predetermined number.

33. In an apparatus for electro-eroding a workpiece by means of current pulses resulting from applying across a machining gap formed between an electrode tool and a workpiece consecutive voltage pulses by switching on and off across said gap at least one source of direct current such that the source is disconnected from across the gap during cut-off time intervals between two consecutive voltage pulses, means for supplying across said gap trains of consecutive pulses, each of said trains comprising a plurality of voltage pulses each having a no-load voltage amplitude higher than a predetermined threshold and said consecutive pulses being separated by a cut-off time interval during which none of said discharges occurs across the gap and means for adjustably controlling the cut-off time interval between two consecutive pulse trains, the improvement comprising means for measuring the machining voltage amplitude of each pulse shortly after the moment at which current flows through the gap, means for effecting a comparison between said voltage amplitude and at least one predetermined value, means for deriving from said comparison a logic signal of alternative values corresponding to a sampling of respectively the presence and absence of characteristic machining discharges, means for storing said logic signal between two consecutive samplings, and means for adjusting as a function of said logic signal the duration of cut-off intervals between two consecutive voltage pulses within a single pulse train and the duration of the cut-off interval between two consecutive pulse trains for controlling the rate of occurrence of said characteristic discharges across said machining gap, wherein each of said characteristic machining discharges is a discharge across said gap for which the discharge voltage amplitude measured between the beginning of a current pulse and the time at which the current is cut off is higher than a voltage amplitude corresponding to arcing or a short circuit across the gap and lower than a predetermined voltage amplitude corresponding to a normal machining discharge.

34. The improvement of claim 33 further comprising means for detecting respectively the presence and absence of a characteristic discharge corresponding to the first discharge within each pulse train, means for providing a logic signal of alternative values corresponding respectively to said presence and absence of said characteristic discharge and means for respectively increasing and decreasing according to said logic signal by progressive steps the cut-off time interval between two consecutive pulse trains.

35. The improvement of claim 34 further comprising means for respectively allowing and preventing the occurrence of said pulse trains according to the significance of said logic signal.

36. The improvement of claim 33 further comprising means for respectively allowing and preventing the occurrence of said pulse trains according to the significance of said logic signal.

37. The improvement of claim 33 further comprising means for providing an analog magnitude representative of the average value of said logic signal and means for varying the duration of said cut-off interval between two consecutive voltage pulses within a single train as a function of the magnitude of the difference between a reference magnitude of predetermined value and said analog magnitude.

38. The improvement of claim 33 further comprising means for detecting the presence or absence of normal machining discharges, means for providing a corresponding logic signal, means for developing an analog magnitude representative of the average value of said logic signal, and means for varying the duration of said cut-off interval between two consecutive pulse trains as a function of the magnitude of the difference between a reference magnitude of a predetermined value and said analog magnitude.

39. The improvement of claim 33 further comprising means for counting the number of said characteristic discharges and means for cutting off a pulse train when the number of said characteristic discharges within said train reaches a predetermined number.

40. The improvement of claim 33 further comprising means for counting the number of machining discharges and means for cutting off a pulse train when the number of said machining discharges within said train reaches a predetermined number.

41. In an apparatus for electro-eroding a workpiece by means of current pulses resulting from applying across a machining gap formed between an electrode tool and a workpiece consecutive voltage pulses by switching on and off across said gap at least one source of direct current such that the source is disconnected from across the gap during cut-off time intervals between two consecutive voltage pulses, means for supplying across said gap trains of consecutive pulses, each of said trains comprising a plurality of voltage pulses each having a no-load voltage amplitude higher than a predetermined threshold and said consecutive pulses being separated by a cut-off time interval during which none of said discharges occurs across the gap and means for adjustably controlling the cut-off interval between two consecutive pulse trains, the improvement comprising means for measuring the slope of the voltage amplitude decay of said pulses shortly after the moment at which current flows through the gap, means for effecting a comparison between said slope and at least one predetermined value, means for deriving from said comparison a logic signal of alternative values corresponding to a sampling of respectively the presence and absence of characteristic machining discharges, means for storing said logic signal between two consecutive samplings, and means for adjusting as a function of said logic signal the number of voltage pulses within a single pulse train, the duration of cut-off intervals between two consecutive voltage pulses within a single pulse train and the duration of the cut-off interval between two consecutive pulse trains, for controlling the rate of occurrence of said characteristic discharges across said machining gap, wherein each of said characteristic machining discharges is a discharge across said gap for which the discharge voltage amplitude measured between the beginning of a current pulse and the time at which the current is cut off is higher than a voltage amplitude corresponding to arcing or a short circuit across the gap and lower than a predetermined voltage amplitude corresponding to a normal machining discharge.

42. The improvement of claim 41 further comprising means for detecting respectively the presence and absence of a characteristic discharge corresponding to the first discharge within each pulse train, means for providing a logic signal of alternative values corresponding respectively to said presence and absence of characteristic discharge, and means for respectively increasing and decreasing according to said logic signal by progressive steps the cut-off time interval between two consecutive pulse trains.

43. The improvement of claim 42 further comprising means for respectively allowing and preventing the occurrence of said pulse trains according to the significance of said logic signal.

44. The improvement of claim 41 further comprising means for respectively allowing and preventing the occurrence of said pulse trains according to the significance of said logic signal.

45. The improvement of claim 41 further comprising means for providing an analog magnitude representative of the average value of said logic signal and means for varying the duration of said cut-off interval between two consecutive voltage pulses within a single train as a function of the magnitude of the difference between a reference magnitude of predetermined value and said analog magnitude.

46. The improvement of claim 41 further comprising means for detecting respectively the presence and absence of normal machining discharges, means for providing a logic signal of alternative values corresponding respectively to said presence and absence of normal machining discharges, means for developing an analog magnitude representative of the average value of said logic signal, and means for varying the duration of said cut-off interval between two consecutive pulse trains as a function of the magnitude of the difference between a reference magnitude of a predetermined value and said analog magnitude.

47. The improvement of claim 41 further comprising means for counting the number of said characteristic discharges and means for cutting off a pulse train when the number of said characteristic discharges within said train reaches a predetermined number.

48. The improvement of claim 41 further comprising means for counting the number of machining discharges and means for cutting off a pulse train when the number of said machining discharges within said train reaches a predetermined number.

49. In a process for machining a workpiece by means of intermittent electrical discharges provided by controlled current pulses whereby consecutive trains of consecutive voltage pulses are applied across a machining gap between said workpiece and an electrode tool by switching on and off across said gap at least one source of direct current such that said source is switched off during pulse cut-off time intervals between two consecutive voltage pulses and during pulse train cut-off intervals between consecutive pulse trains, and wherein characteristic discharges are detected, each of said characteristic discharges being one for which the discharge voltage amplitude measured between the beginning of a current pulse and the time at which the current is cut off is comprised between predetermined values, the higher of said values corresponding to a normal machining discharge and the lower of said values corresponding to arcing or short circuit across the gap, the improvement comprising varying the length of the cut-off time interval between consecutive pulses within a single pulse train after detection of a predetermined number of successive characteristic discharges as a function of the difference between the total number of pulses within the pulse train and a reference number for maintaining said number of characteristic discharges within predetermined limits.

50. The process of claim 49 further comprising varying the cut-off interval between consecutive pulse trains as a function of said difference between the total number of said pulses within a pulse train and a reference number.

51. In a process for machining a workpiece by means of intermittent electrical discharges provided by controlled current pulses whereby consecutive trains of consecutive voltage pulses are applied across a machining gap between said workpiece and an electrode tool by switching on and off across said gap at least one source of direct current such that said source is switched off during pulse cut-off time intervals between two consecutive voltage pulses and during pulse train cut-off intervals between consecutive pulse trains, and wherein characteristic discharges are detected, each of said characteristic discharges being one for which the discharge voltage amplitude measured between the beginning of a current pulse and the time at which the current is cut off is comprised between predetermined values, the higher of said values corresponding to a normal machining discharge and the lower of said values corresponding to arcing or short circuit across the gap, the improvement comprising varying the length of the cut-off time interval between consecutive pulse trains after detection of a predetermined number of successive characteristic discharges as a function of the difference between the total number of the pulses within a single pulse train and a reference number for maintaining said number of characteristic discharges within predetermined limits.

* * * * *